United States Patent

[11] 3,565,044

[72] Inventor Leonard D. Sorrels
     P.O. Box 868, El Reno, Okla. 73036
[21] Appl. No. 798,328
[22] Filed Feb. 11, 1969
[45] Patented Feb. 23, 1971

[54] PORTABLE CATTLE FEEDER
     4 Claims, 6 Drawing Figs.
[52] U.S. Cl. .................................................. 119/53
[51] Int. Cl. .................................................. A01k 5/00
[50] Field of Search .......................... 119/52, 53, 53.5, 54; 119/53

[56] References Cited
     UNITED STATES PATENTS

| | | | |
|---|---|---|---|
| 1,282,716 | 10/1918 | Emrick | 119/53.5 |
| 1,368,708 | 2/1921 | Easter | 119/53 |
| 2,290,042 | 7/1942 | Granville | 119/52 |
| 2,352,859 | 7/1944 | Palmer | 119/54 |
| 2,363,212 | 11/1944 | Wagner | 119/53.5 |
| 2,650,566 | 9/1953 | Rook | 119/53.5 |
| 2,863,419 | 12/1958 | Morrell | 119/52X |

*Primary Examiner*—Hugh R. Chamblee
*Attorney*—Dunlap, Laney, Hessin & Dougherty ABSTRACT: An improved portable livestock feeder having a hinged top loading door with means for automatically locking said door in an open position, and having slidable side unloading doors for unloading said feed by gravity. Means for locking said side unloading doors in selected positions are provided whereby the rate at which the feed is unloaded from said feeder may be controlled and means are provided for agitating the feed within the feeder while it is being unloaded.

INVENTOR.
LEONARD D. SORRELS

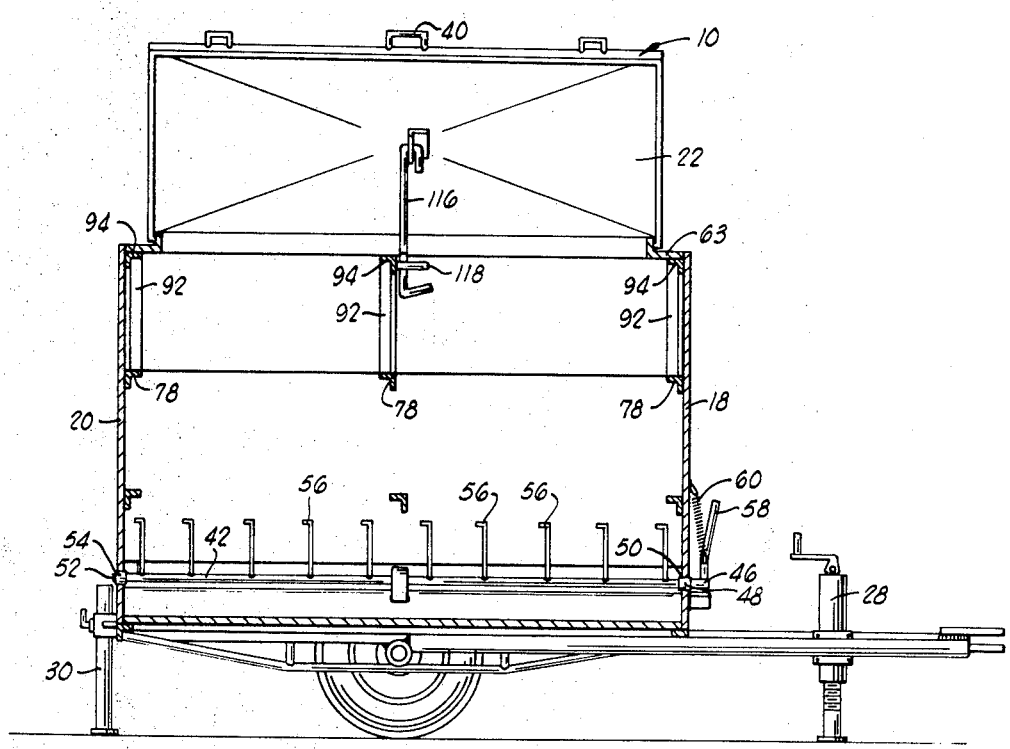
Fig. 4
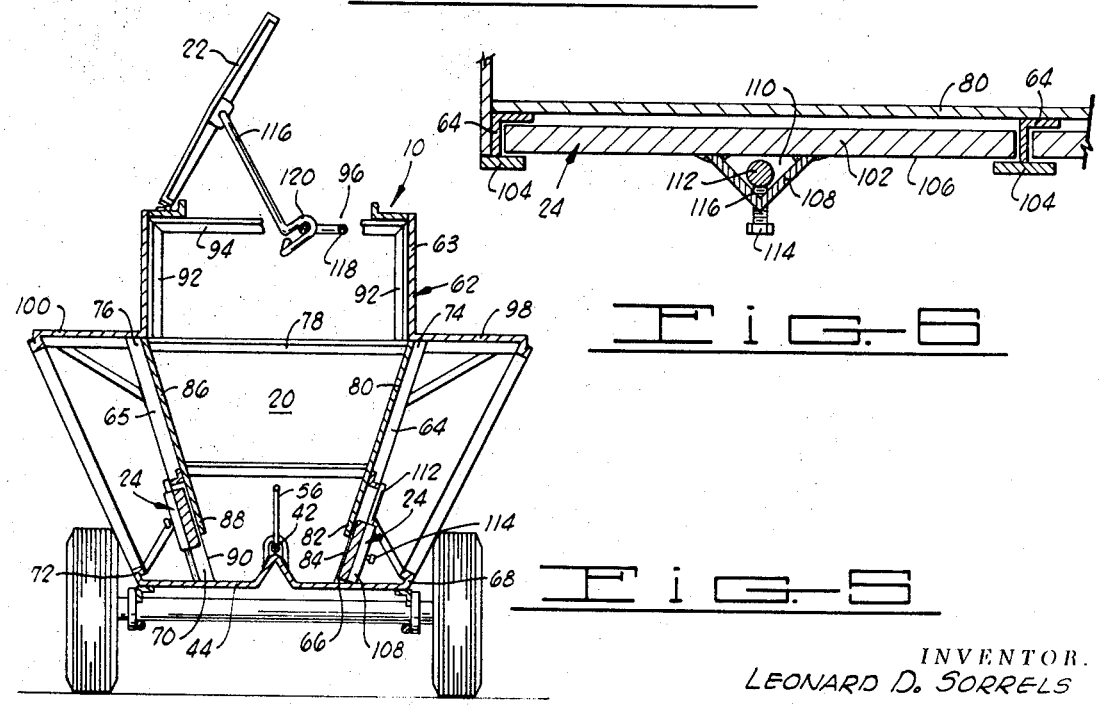
Fig. 6
Fig. 5
INVENTOR.
LEONARD D. SORRELS
BY
Dunlap, Janney, Hessin & Dougherty
ATTORNEYS

PORTABLE CATTLE FEEDER

BACKGROUND OF THE INVENTION

1. Field of the Invention

This invention relates generally to an improved portable livestock feeder, and more particularly, but not by way of limitation, to an improved portable livestock feeder having slidable side unloading doors and means for locking said doors in selected positions whereby the rate at which the feed is unloaded from said feeder can be controlled, and having means for agitating the feed within the feeder while it is being unloaded.

2. Description of the Prior Art

Many various types of portable livestock feeders have been developed. Commonly such feeders include a feed container mounted on a chassis having wheels which may be attached to a pickup truck or tractor for transport to a pasture where livestock are confined. Such feeders normally include a top loading door for filling the container and side doors positioned adjacent to feeding troughs which when opened allow the feed to flow by gravity into the feeding troughs.

Prior to the present invention numerous problems have been encountered in the use of portable livestock feeders. During the transport of the feeder from the point where it is filled with feed, such as at a silo or barn, to the pasture wherein the cattle are confined, the feed will be tightly compacted within the feed container due to bumping and jostling on farm roads. As a result, when the side unloading doors are opened little or no feed will flow into the feeding troughs.

Another problem in the use of prior portable feeders has been that the unloading doors could not be effectively locked in a desired position between fully opened and fully closed, and as a result, too much or too little feed will enter the feeding troughs. While some prior portable feeders have included apparatus for locking the unloading doors, these apparatus have been rendered relatively ineffective due to clogging of the apparatus by feed or jamming of the unloading doors in a partially opened or closed position.

Yet another problem associated with prior portable livestock feeders has been that no effective locking device has been provided on the top loading door. Thus, if the top loading door is opened in a high wind there is a danger that it will be jerked loose from the hand of the opener and forcibly flung open or closed thereby endangering the opener and oftentimes damaging the feeder.

SUMMARY OF THE INVENTION

The present invention relates to a portable livestock feeder including an enclosure for containing feed having a hinged top loading door and a plurality of slidable side doors for unloading said feed by gravity, said enclosure including means for locking said slidable side doors in a desired position so that the rate at which said feed is unloaded from said enclosure may be controlled, and means for agitating said feed disposed within said enclosure so that the flow of feed through said doors can be maintained while said enclosure is being unloaded.

It is, therefore, a general object of the present invention to provide an improved portable livestock feeder.

Another object of the present invention is the provision of a portable livestock feeder having means disposed within the feed container for agitating the feed while it is being unloaded thereby insuring a continuous flow of feed from the enclosure.

Another object of the present invention is the provision of means for guiding and locking the slidable side unloading doors in any desired position which will not become inoperative due to clogging by feed or jamming.

Still another object of the present invention is to provide a portable livestock feeder having a hinged top loading door which includes means for automatically locking the door in an open position once it is opened thereby preventing the door from being forcibly slammed open or shut by wind.

Other objects and advantages of the invention will be evident from the following detailed description when read in conjunction with the accompanying drawings which illustrate the invention.

BRIEF DESCRIPTION OF THE DRAWINGS

FIG. 4 is a sectional view taken along line 4—4 of FIG. 2.

FIG. 5 is a sectional view taken along line 5—5 of FIG. 1, and

FIG. 6 is an enlarged top sectional view of one of the slidable side unloading doors of the present invention.

DESCRIPTION OF THE PREFERRED EMBODIMENTS

Figure 1:
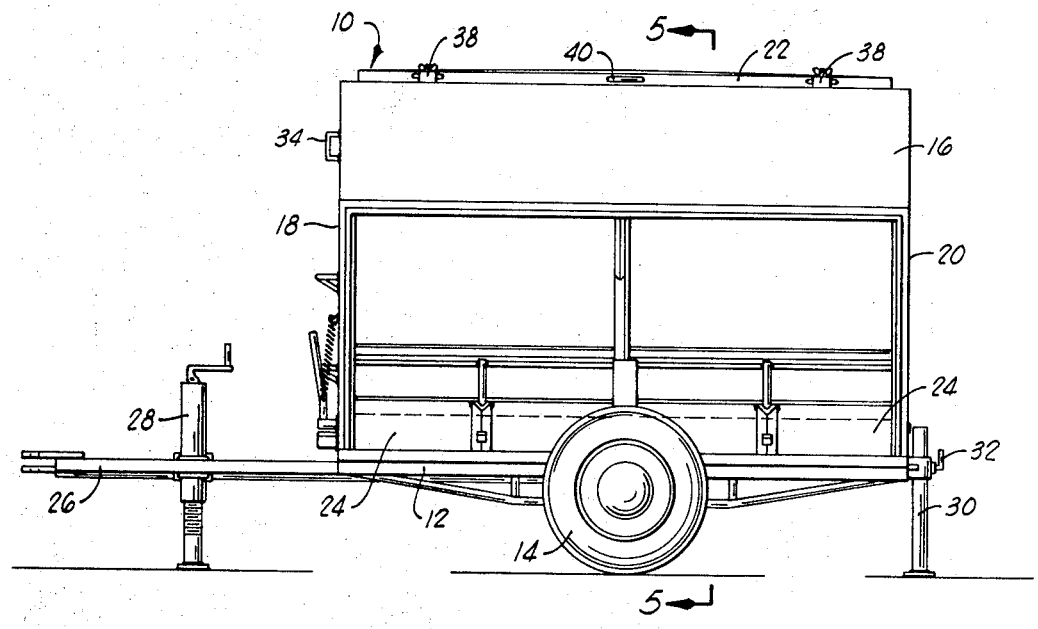
FIG. 1 is a side view of the improved portable livestock feeder of the present invention.
Figures 2, 3:
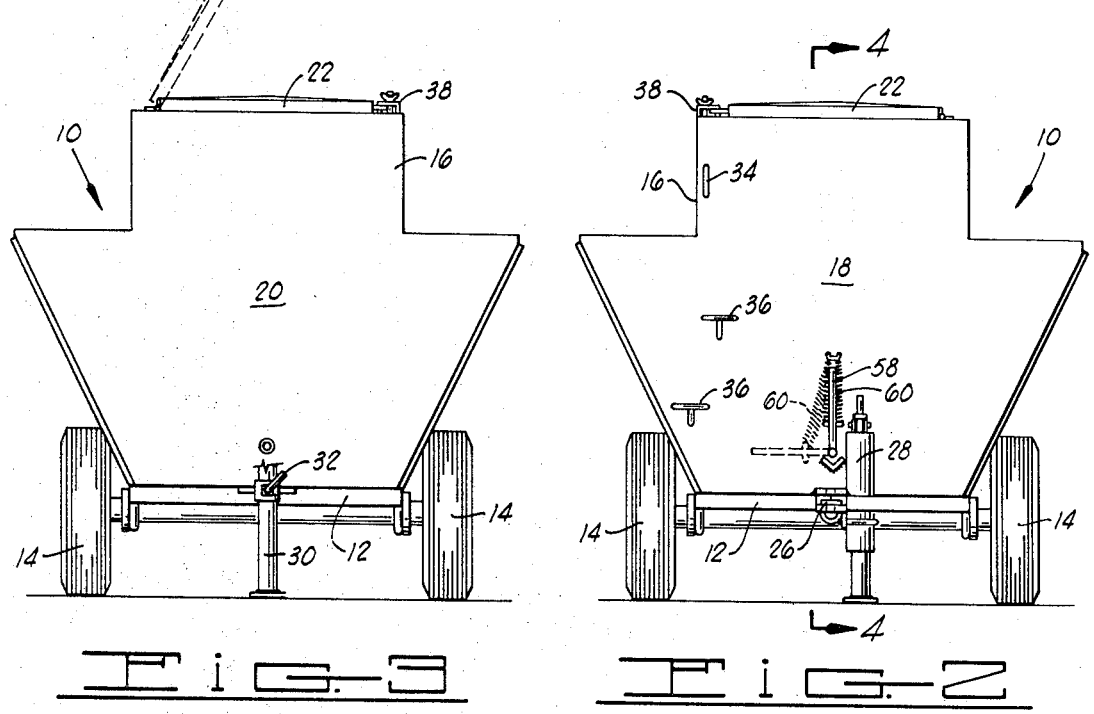
FIG. 2 is a view of one end of the feeder of FIG. 1.
FIG. 3 is a view of the other end of the feeder of FIG. 1.

Referring now to FIGS. 1 through 3, the portable livestock feeder of the present invention is illustrated generally designated by the numeral 10. The feeder 10 basically comprises a chassis 12 having wheels 14 mounted thereon and a feed enclosure 16 mounted on said chassis having a forward end 18 and a rearward end 20. The enclosure 16 includes a hinged top loading door 22 and a plurality of slidable side unloading doors 24. The chassis 12 includes a tongue 26 at its forward end which may be attached to a pickup truck of a tractor for transporting the feeder 10 from place to place. A conventional screw type leveler 28 is attached to tongue 26 of chassis 12 and a conventional adjustable foot member 30 is attached to chassis 12 at its rearward end which may be locked in a desired position by locking screw 32. Forward end 18 of container 16 (FIG. 2) includes a hand hold 34 and steps 36 formed of rod which are welded to forward end 18 of enclosure 16. Handle 34 and steps 36 provide access to the top of enclosure 16 for opening and closing hinged door 22. Conventional locking devices 38 are attached to enclosure 16 for locking door 22 in the closed position, and a handle 40 is attached to door 22 for opening and closing it.

Referring not to FIGS. 4 and 5, a shaft 42 is disposed within container 16 parallel to the bottom 44 of container 16. The forward end 46 of shaft 42 passes through and is journaled in a bearing sleeve 48 which is in turn welded into an opening 50 in the forward end 18 of enclosure 16. The rearward end 52 of shaft 42 passes through and is journaled in a bearing sleeve 54 which is in turn welded into an opening in rearward end 20 of enclosure 16. A plurality of arms 56 are attached to shaft 42 and are spaced along the length of shaft 42. All of arms 56 lie in a single plane, and a handle 58 positioned in the same plane as arms 56 is attached to forward end 46 of shaft 42 outside of enclosure 16. A resilient spring member 60 is attached to handle 58 at one end and to forward end 18 of enclosure 16 at its other end. Spring member 60 serves to maintain handle 58 and arms 56 in an upright position.

Referring now to FIGS. 4 and 5, it may be seen that enclosure 16 is comprised of a forward end 18, a rearward end 20, a bottom 44 and a top assembly 62. Top assembly 62 and bottom 44 are spaced apart by angle support members 64 on one side and angle support members 65 on the other side. The lower ends 66 of angle support members 64 are attached to bottom 44 at a point approximately halfway between shaft 42 and the outer end 68 of bottom 44 with angle support members 64 positioned in a plane parallel to shaft 42. The lower ends 70 of angle support members 65 are attached to bottom 44 at the point approximately halfway between shaft 42 and the outer end 72 of bottom 44 with support members 65 positioned in a plane parallel to shaft 42. The upper ends 74 of support members 64 and the upper ends 76 of support members 65 are attached to angle support members 78 which are positioned in a plane parallel with bottom 44. Supporting members 64 and 65 are sloped outwardly in opposite directions thereby forming a space between bottom 44 and angle support members 78 in the form of an inverted trapezoid. A sidewall 80 formed of sheet metal is attached to angle support members 64 and is attached to ends 18 and 20 and top assembly 62 of enclosure 16. The lower end 82 of sidewall 80 terminates a distance above bottom 44 thereby forming an opening 84 along the entire length of enclosure 16 on one side. A sidewall 86 formed of sheet metal is attached to angle support members 65 and is attached to ends 18 and 20 and top assembly 62 of enclosure 16. The lower end 88 of sidewall 86 terminates a distance above bottom 44 thereby forming opening 90 along the entire length of enclosure 16.

Top assembly 62 is comprised of a plurality of vertical angle supporting members 92 which are in turn attached to a plurality of horizontal supporting members 94 at their top ends. A sheet metal covering 63 is attached to angle support members 92 and 94. Top 62 includes an opening 96 which is covered by top loading door 22. A portion 98 of covering 63 extends outwardly from side 80 in a plane parallel with bottom 44 and a like portion 100 of covering 63 extends outwardly from side 86 in a plane parallel with bottom 44. Portions 98 and 100 of covering 63 are attached to angle support members 78 which also extend outwardly from sides 80 and 86.

Slidable doors 24 are positioned over openings 84 and 90 previously described. Each of slidable doors 24 are identical and are positioned between two of angle support members 64 or 65 previously described. Referring to FIG. 6, one of doors 24 positioned between support members 64 is illustrated. Door 24 is comprised of a piece of sheet metal of rectangular shape and is held adjacent to angle support members 64 by metal straps 104 welded to angle support members 64. Thus, door 24 is free to slide up and down between angle support members 64. Attached to the outer surface 106 of door 24 is a member 108 of angular cross section positioned parallel to angle support members 64 thereby defining a space of triangular cross section 110 between the outer surface 106 of door 24 and member 108. An elongated rod 112 is disposed within triangular space 110 and is attached to bottom 44 of enclosure 16 and wall 80 of enclosure 16. A locking bolt 114 is threadedly secured in a threaded bore 116 positioned perpendicular to the surface 106 of door 24 through the apex of the angle formed by member 108. Thus, door 24 may be secured in a desired position by tightening lock bolt 114 against rod 112.

Referring again to FIGS. 4 and 5 it may be seen that a rod 116 is movably attached to hinged top loading door 22. Another rod 118 formed in the shape of a U is attached to one of support members 94. The rod 116 has a U-shaped configuration 120 formed in one end for engagement with he rod 118 and is disposed within the U-shaped rod 118.

OPERATION I

In operation the portable livestock feeder 10 is filled with feed through hinged top loading door 22. When top loading door 22 is opened rod 116 will slide within the U-shaped rod 118 until U-shaped portion 120 of rod 116 engages rod 118. Thus by opening door 22 U-shaped portion 120 of rod 116 will automatically engage rod 118 and lock door 22 in the open position. When it is desired to lower door 22, rod 16 may be lifted upwardly disengaging U-shaped portion 120 from rod 118 thereby allowing door 22 to be closed.

After portable livestock feeder 10 has been transported to a location for feeding livestock, doors 24 may be opened to a desired position and locked by tightening bolts 114 previously described thereby controlling the gravity flow of feed through doors 24. As will be understood, it may be desirable to open only one of doors 24, or all of doors 24 depending on the number of livestock to be fed.

Upon opening doors 24, if the feed contained within enclosure 16 has been compacted and will not flow through doors 24, handle 58 may be moved in either or both directions from the vertical position thereby rotating shaft 42 and arms 56 through the feed will break up any bridges that may have formed between walls 30 and 86 within enclosure 16 thereby insuring free flow of the feed through openings 86 and 90.

As will be understood, the portions of bottom 44 extending outwardly from the points at which angle supporting members 64 and 65 are attached serve as feeding troughs for the livestock. That is, the feed flows from within enclosure 16 through openings 84 and 90 onto bottom 44. The livestock can then devour the feed on floor 44 from either side of enclosure 16.

It will also be understood that outwardly extending portions 98 and 100 of covering 63 serve as a covering for the troughs formed by bottom 44 thereby protecting the feed on floor 44 from rain, etc.

It has been found that the doors of the present invention will not become inoperative due to jamming or clogging by feed. While some of the feed may have a tendency to work its way into the triangular spaces between angle members 108 and doors 24, it will not prevent bolts 114 from turning easily. This is due to the fact that the bolts 114 are threadedly secured in threaded bores 116 extending through the apex of the angle formed by members 108 as shown in FIG. 6. While feed can get on the top portions of the threads of bolts 114, only part of the threads are exposed and any feed contained thereon will be removed by the threads of bores 116 as the bolts are threaded outwardly. Furthermore, rods 112 and angular members 108 serve to hold doors 24 in a position so that the ends of doors 24 are always parallel to angle members 64 and 65. Thus doors 24 are prevented from jamming since they cannot be wedged in a crosswise position between angle members 64 and 65.

The present invention therefore is well adapted to carry out the objects and attain the ends and advantages mentioned as well as those inherent therein. While presently preferred embodiments of the invention are given for the purpose of disclosure, numerous changes in the details of construction and the arrangement of parts can be made which will readily suggest themselves to those skilled in the art and which are encompassed within the spirit of the invention disclosed herein.

I claim:

1. In a portable livestock feeder including an enclosure for containing feed having a hinge top loading door and having a plurality of slidable side doors for unloading said feed by gravity, the improvement comprising:

at least one feeding trough positioned adjacent to said slidable side doors for receiving said feed;

means for locking said slidable doors in a desired position attached to said enclosures so that the rate at which said feed is unloaded from said enclosure may be controlled, said means including:

an elongated member of angle shape in cross section attached to the outside surface of each of said slidable doors and positioned parallel to the direction of slide of said doors, each of said members having a threaded bore therein at the apex of said angle positioned perpendicular to the surface of said doors, a locking bolt threadedly secured in each of said bores; and an elongated rod disposed within the space between each of said members and each of said doors and attached to said enclosure so that said locking bolts can be tightened against said rods at desired points between opened and closed positions of said doors thereby locking said doors; and means for agitating said feed disposed within said enclosure so that the flow of feed through said doors can be maintained while said enclosure is being unloaded.

2. The portable livestock feeder of claim 1 wherein said means for agitating said feed within said enclosure comprises:

said enclosure having a pair of aligned openings in opposite sides thereof;

an elongated shaft positioned within said enclosure journaled in said openings;

a plurality of elongated arm members attached to said shaft spaced along the length of said shaft; and means for rotating said shaft from the outside of said enclosure attached to said shaft.

3. The portable livestock feeder of claim 2 which is further characterized to include means for automatically locking said hinged top loading door in an open position.

4. The portable livestock feeder of claim 3 wherein said means for automatically locking said hinged top loading door comprises:
   a U-shaped member attached to said enclosure; and
   an elongated rod moveable secured to said door at one end and having a U-shaped configuration formed at the other end thereof, said rod being disposed within said U-shaped member so that said U-shaped portion of said rod engages said member when said door is opened.